INVENTOR
THOMAS P. NEUBERGER
and WALTER E. MYLES

BY *William Grobman*

ATTORNEY

Dec. 29, 1970  T. P. NEUBERGER ET AL  3,551,043
VIRTUAL IMAGE WINDOW DISPLAY
Filed Dec. 2, 1965  3 Sheets-Sheet 2

INVENTORS
Thomas P. Neuberger
Walter E. Myles

BY *William Grobman*

ATTORNEY

Dec. 29, 1970    T. P. NEUBERGER ET AL    3,551,043
VIRTUAL IMAGE WINDOW DISPLAY

Filed Dec. 2, 1965    3 Sheets-Sheet 3

INVENTOR
THOMAS P. NEUBERGER
and WALTER E. MYLES

BY William Grobman

ATTORNEY

United States Patent Office 3,551,043
Patented Dec. 29, 1970

3,551,043
VIRTUAL IMAGE WINDOW DISPLAY
Thomas P. Neuberger, Baltimore, Md., and Walter E. Myles, Alexandria, Va., assignors to Singer-General Precision, Inc., Binghamton, N.Y., a corporation of Delaware
Filed Dec. 2, 1965, Ser. No. 511,149
Int. Cl. G03b 21/26
U.S. Cl. 353—37
5 Claims

ABSTRACT OF THE DISCLOSURE

A visual system including a viewing window to present to a viewer a realistic composite image representing objects at varying distances from the viewer. Each image is generated in an appropriate generator such as a photographic transparency projector, a projection television display tube, and the like, each of which generators projects its image onto a projection screen. At least one of said screens is mounted to be movable about the focal point of the viewing lens to create the impression that the image projected thereon is a variable distance from the viewer. The system includes means for combining the several images on the separate screens in a single lens to create a composite image having portions which appear to be at varying distances from the viewer. The viewing lens and the field lenses adjacent each image generator are substantially identical, and one compensates for the aberrations of the other.

This invention relates to displays and, more particularly, to displays of virtual images which are composites of two or more separate images.

In the training of pilots and passengers for travel through interplanetary space, the very nature of the mission itself indicates the necessity of simulated flights for training purposes. The problems of landing a craft upon a distant celestial body or of rendezvousing in space with other vehicles will be at least partially accomplished by the pilot's reaction to visual observations made through windows provided for this purpose. Suitable training in simulated vehicles infers proper simulation of the visible stimulations to the pilot as well as blind stimulations. To provide such suitable simulations of visible phenomena, the displays must be capable of simulating relative movement of a close object with respect to a more distant background. In addition, the proper responses are evoked only by displays which are realistic in appearance as well as in movement of both the simulated objects and the observer.

The simulated display must incorporate a background which appears to be at an infinite distance from the observer and which must yet change in appearance with the progress of the simulated mission; and it must also incorporate images representative of objects relatively close to the observer, which objects not only may change in appearance as the simulated mission progresses, but which may also vary in distance from the observer as time moves on. In addition, the close objects must be viewable from any of several different angles and at each must present a believable and realistic image. Thus, as a simulated mission progresses, the display must vary also, and in a wholly believable fashion.

There are several things which contribute to the believability of a display. One is the fidelity with which the relative distances of objects of varying distance from the observer is simulated. Another is the elimination of aberration which normally is present in optical systems, and especially in displays which may include the projection of images on flat surfaces or from flat surfaces. Another factor is the ability of the display to appear natural from any aspect from which it is viewed by the observer. It must appear to move realistically or to stand still as the observer moves his head.

Plausibility is important in instilling in the mind of a trainee in a simulated situation the impression that he is really taking part in an actual mission. The closer to the actual situation he believes himself to be, the more effective will be both his responses and the actual training itself. On important aspect of a display is the depth impression created. To achieve an appearance of reality, objects close to the observer must appear to be close, and objects distant must appear to be distant. When celestial objects are portrayed, their distance from an observer must appear to be infinite, particularly with respect to other space vehicles, and the like. One manner in which this particular aspect of a display may be created is to provide the appearance of objects which are supposed to be at differing distances from the observer with differing relative movements with time. Thus, as a mission progresses, the appearance of a fixed star background will change; different constellations will be presented for example; but the changes of the star background will be at a much slower rate than the changes in the appearance of closer objects. Thus, an approaching object will appear to approach against an apparently unchanging background while, actually, the background is also changing, but at a slower rate.

Distortion in the presentation of a display probably does more to destroy the appearance of reality than anything else. In fact, the elimination of distortion in images is the subject of much research. There are two general types of distortion which are importance in imagery. They are color aberration and spherical aberration. Chromatic aberration is the focusing of the various colors at different points, producing a spectrum spread; spherical aberration is the deviation of light rays from an expected path with respect to adjacent light rays. A display in a simulated training device must be corrected for optical aberrations. Unfortunately, in the past optical correction systems have been complex and expensive and have usually resulted in dim imagery due to the absorption of much of the light being transmitted.

Parallax is present in virtually all objects which are viewed. Parallax is the apparent displacement of an object being viewed as the viewer changes his position with respect to that object. This is particularly true with close objects viewed against a distant background. Thus, if a display is to depict a close object against a fixed star background, the close object must appear to move more than the stars as the viewer moves his head. This is one aspect of simulated displays which has been the most overlooked, and yet, it is one of the most important when plausibility is to be achieved. Obviously, if an observer moves his head to the right, and the moon in a display appears to rapidly move to the left, the impression of reality is destroyed.

Another factor which contributes to the plausibility of the display is the angle of view, or, the amount of the field visible to the viewer. If a window is used as the display object itself, that is if the viewer is to look through a window (real or simulated) to see the images presented, then, as the viewer moves closer to the window, his field of vision should grow. Also, as the viewer looks up or down, he should be able to see things which are not visible when he is back from the window and looking straight out. In addition, close objects should be displayed so that as a simulated mission proceeds, several aspects of the object are presented.

The creation of the images to be presented is one of the operations which can add to or detract from the plausibility of the final display. There are several ways in which an image may be created, and each has its primary advantages and disadvantages. The system of this invention utilizes any of several image sources, all of which will be discussed herein.

One obvious source of images is, of course, the projection of light through a transparency which carries a reproduction of the object being presented. Photographic slides may be used for still objects or objects which change very little, or moving film strips may be used for more rapidly changing views. In either case, the programming of the projection to change with the simulated mission may present a complex problem requiring the use of computers and several servo loops.

The use of television transmission to create the impression of rapidly changing views of an object is another system which can be used to create images for simulation. But television systems suffer from poor resolution, edge distortion, and the like. Thus, the use of television systems may be limited.

For fixed star backgrounds and the display of objects which appear to be little more than points of light, a planetarium or similar device may be used. This comprises a hollow sphere mounted for three degrees of rotation with perforations in its surface and a light source in its interior.

Inu order to create images of stars which are realistic, the perforations in the surface of the sphere contain lens systems therein. The lens systems, which are contained in small cylinders, tend to focus the light passing therethrough. This gives to the projections of the light from the interior of the planetarium, the appearance of stars rather than just small diameter spots of light.

To create images of solid objects such as celestial bodies which have more visual details than do stars, models which are mounted to change position so as to present different aspects may be used. The image of the model may be created by a television camera focused thereon or by the use of lenses which project the reflected light from the model onto a screen, or the like. When solid models are used, an external source of light must be used, and the source should be so arranged that any desired portion of the surface of the model can be illuminated. In this manner, if the moon, for example, is being displayed, the changing surface of the moon, as a spacecraft moves closer to it and around it, can be presented as it should be.

Major considerations of the display system should be the complexity of the equipment used to accomplish the desired results and the costs, both the initial cost and the maintenance cost. While it is desirable to achieve the features mentioned above in a single display system for training purposes, there is a practical limit to the price which can be paid for such a system. Cost is a very important consideration in the construction of a display system.

It is an object of this invention to provide a new and improved display system.

It is another object of this invention to provide a new and improved display system for displaying images which are at different distances from the observer.

It is a further object of this invention to provide a new and improved display system which presents to an observer a credible view of several objects, both fixed and movable, at different relative distances with the ability to display varying aspects of the same objects.

It is still a further object of this invention to provide a new and improved display system for plausibly displaying the images of movable objects against a fixed background utilizing relatively inexpensive lens systems.

It is yet another object of this invention to provide a new and improved lens system for creating credible composite displays of the images of several objects.

It is still a further object of this invention to provide a plausible composite display of the images of several objects which appear to be at varying distances from the observer, which display is comparatively inexpensive.

Other objects and advantages of this invention will become more apparent as the description proceeds, which description should be considered together with the accompanying drawings in which.

Figure 1:
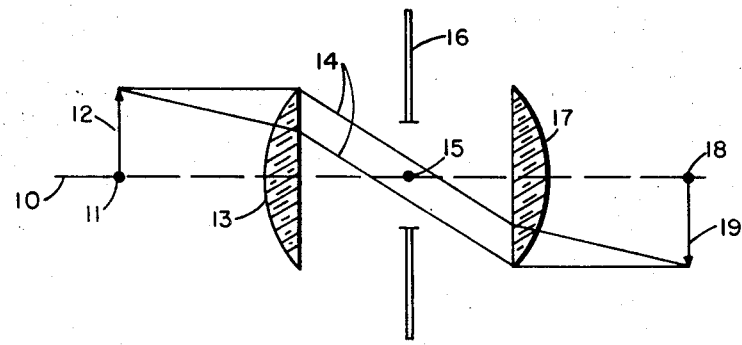
FIGS. 1 and 2 are schematic showings of compensating lens systems.
Figure 2:
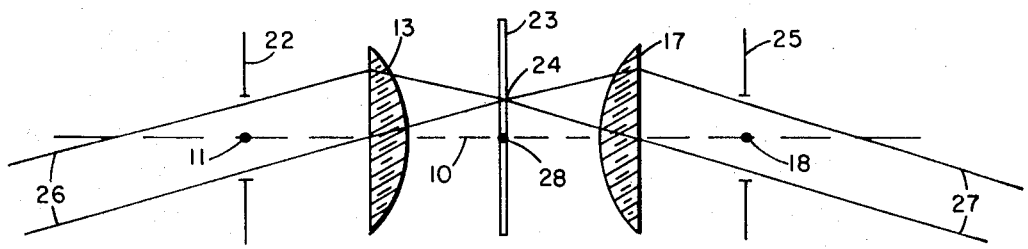

Referring now to the drawings in detail and to FIGS. 1 and 2 in particular, the reference characters 13 and 17 designate two plano-convex lenses which are symmetrical about a common optical axis 10. The lenses are spaced apart on the common axis 10. Symmetrically placed about the point 15 in FIG. 1 is an optical stop 16 which reduces the effective diameters of the lenses 13 and 17. As shown in FIG. 1, the image of an arrow 12 is projected through the lens 13, through the stop 15, and through lens 17. The arrow 12 is placed at the point 11 near the lens 13, and an observer would see the image 19 of the arrow 12 at the point 18. The two lenses 13 and 17 together with the stop 16 serve as a self-compensating lens system in which the distortions introduced by one of the lenses 13 are corrected by the other lens 17. Since the two lenses 13 and 17 are identical and are oppositely disposed about the common point 15, one lens has a tendency to modify light passing through it in a manner opposite to that in which the light is modified by the other lens. For example, since the refraction index of glass is not the same for all wave lengths of visible light, the blue wave lengths tend to be bent more than the red wave lengths and a color spread of the light passing through lens 13 takes place. When the light passes through the lens 17, it is reconstituted and the color spread is eliminated. Additional discussion of this type of lens system is found in "Fundamentals of Optics," by Jenkins and White, third edition, published by McGraw-Hill Book Co., New York. The system in FIG. 2 is slightly different from that shown in FIG. 1 in that a pair of stops, a field stop 22 and an object stop 25, is used instead of the single aperture stop 16. The two lenses 13 and 17 are symmetrical about a common optical axis 10 and equidistant on either side of a focal point 15. The field stop 22 is symmetrically disposed about the point 11 and the object stop is symmetrically disposed about the point 18. A projection screen 23 of the semi-transparent or rear projection type is shown placed at the common focal point 28 and disposed perpendicularly to the common axis 10. Light rays from an original object, shown in FIG. 2 at 26, pass through the lens 13 and are focused onto the screen 23 at the point 24. The light from the point 24 is then passed through the lens 17 and appears to an observer at the point 18 as light rays 27 which present an image of the original object. In this system, the image of the original object is projected onto a flat screen and is then picked up from the screen and projected to an observer. Again, the lens 17 compensates, or corrects, for the aberrations introduced by the lens 13.

Figure 3:
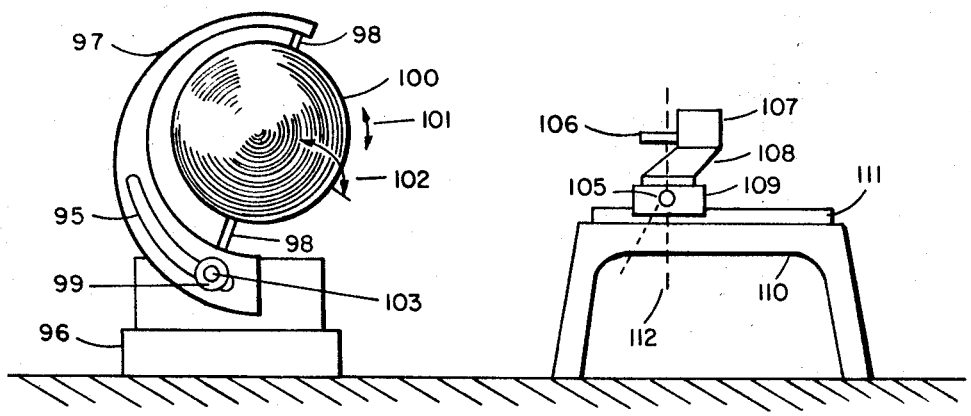
FIG. 3 is an elevational view of one type of image creation system.

Image creation is an important part of any display system which attempts to achieve plausibility. In FIG. 3, the image generator comprises a model 100 of a celestial body. For this discussion, consider the body to be the earth's moon. The model 100 is mounted on an axis 98 which is supported for rotation on an arcuate frame 97. The frame 97 is provided with a slot 95 through which a set screw 103 is passed. The set screw 103 is carried by a base 96, and the frame 97 is positioned with respect to the base 96 by adjusting the position of the slot 95 with respect to the set screw 103. A lock nut 99 on the set screw 103 locks the frame 97 in a desired position. Adjacent to, but spaced from, the model 100 is an optical pickup device having a lens system 106 mounted in a housing 107. The housing 107 is mounted on a base 108 which is supported by a shaft 105 carried by a carriage 109. Carriage 109 is movable on guide rails 111 toward and away from the model 100. The entire arrangement including the guide rails 111 is mounted upon a framework 110. The base 108 is rotatable about the shaft 105 to a limited extent, so that the lens system 106 may be focused upon various portions of the model 100.

The model 100 is illuminated from an external lighting source (not shown) so that if it is tilted by moving the frame 97 to change the angle which the axle 98 forms with the horizontal, and the angle formed by the axis of the lens system 106 is changed by the rotation of the base 108 on the shaft 105, different portions of the model 100 may be suitably and properly illuminated. In addition, the illumination of the model 100, which for this discussion is considered to be the moon, may be varied to simulate the lighting of the moon itself as it varies in its positons with respect to the sun. The light which is reflected from the surface of the model 100 is picked up by the lens system 106 and projected onto the desired surface which is arranged behind the lens system 106. For example, the housing 107 may contain an orthicon television pickup tube and the image generated may be a television image. Or, the housing 107 may contain a photographic film, either still or moving, to form a photographic image of the model 100. Or, the housing 107 may contain a projection screen onto which the image passing through the lens system 106 is projected. With any of these devices, the operation of the over-all system is the same.

The model 100 is rotatable on its axis 98, and the axis 98 is arranged so that it may be tilted within limits. Thus, the model 100 may be programmed to move automatically, or may be operated manually, to gradually change the face it presents to the lens 106. In this manner, a simulated mission may be arranged so that the image of the moon varies as a ship approaches it and then goes around it. With suitable lighting, the moon may be made to appear in all of its phases and from any apparent distance. In addition, the lens 106 may be tilted so that it picks up one portion or another of the model 100. The angle of viewing may be changed gradually also as a simulated mission progresses to indicate the movement of a viewer toward one pole or the other. Movement of the housing 107 toward and away from the model 100 may produce the effect of an approaching or receding moon.

Figure 4:
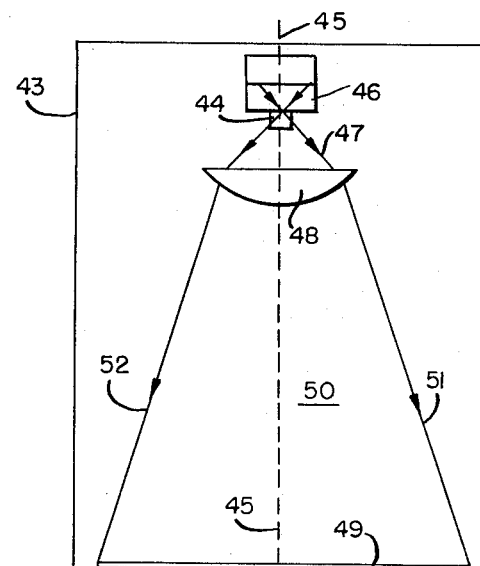
FIG. 4 is a schematic diagram of a system for creating a composite display according to this invention.

The principles of the display system of this invention can be explained with reference to FIG. 4 in which two separate optical systems 30 and 50 are illustrated. Consider first the system 30 in which an image generator 31 in the form of a housing containing a light source (not shown) and a lens system 29 having an optical axis 10 transmits an image to the positive lens 13. The lens 13 lies on the optical axis 10. Facing the lens 13 on the axis 10 is a duplicate lens 17 as shown in FIG. 2. Midway between the lenses 13 and 17 and at the focal point 15 is a semi-transparent screen 23 upon which the image transmitted through the lens 13 is projected. A transparency is mounted in the housing 31, and the light passes from the source through the transparency and the lens system 29 to provide a field having an angular width A. The second lens system 50 comprises an image generator 46 which is similar to the generator 31 and includes a lens system 44. A positive lens 47 similar to the lenses 13 and 17 is positioned before the generator 46. A semi-transparent screen 49 is located on the optical axis 45 of the lens 48 at about the focal point of that lens. A light splitter, or semi-transparent mirror 37, is centered about the intersection of the optical axis 10 of the lens 13 and the optical axis 45 of the lens 48 and forms an angle of 45 degrees with both of these axes. The mirror 37 is so located with respect to the lenses 13, 17 and 48 that the distance between the lenses 17 and 48 along the optical axis 45 bent by the mirror 37 may be equal to the distance along the optical axis 10 between lenses 13 and 17. Screen 23 is stationary; screen 49 is movable.

The light from the source in the housing 31 passes through the transparency in the housing and through the lens system 29 to the lens 13. The image field through the transparency and through the lens 29 has an angular width A and is limited by the dimensioning of the parts. The lens 29 serves as an image stop. The light coming from the generator 31 defining the desired image is designated by light rays 34 and 36 and forms, on the screen 23, the desired image. Screen 23 is a rear projection, or semi-transparent screen, and the image formed thereon is also picked up by the lens 17. Both lenses 13 and 17 are located a focal length away from the screen 23. A viewer peering through lens 17 looks through an object stop 55 and sees the desired image with the distortions introduced by the lens 13 corrected. The field of view passing through the stop 55 covers an angle A, which is equal to the width of the field of view from the generator 31.

In the meantime, the generator 46 is operating in a manner similar to that of the generator 31. Light from a source (not shown) passes through a transparency (also not shown), both of which are contained in the housing 46, and through the lens system 44 to project through the lens 48 the desired image from the transparency. Since the generator 46 is similar to the generator 31, the angular width of the field therefrom is the same as that from generator 31. The image passes through the lens 48 with the opening in the generator 46 serving as a stop, and the image is formed on the screen 49. The screen 49 is movable as contrasted with the screen 23 which is fixed in position. The light which defines the image on the screen 49 passes to the semi-transparent mirror 37 and is reflected through the lens 17 toward the observer. The image from the screen 23 also passes through the mirror 37, and the two images are super-imposed there. It has been found that lenses 13 and 48 may be similar to, but not necessarily identical to, the lens 17 and still provide correction of the distortion to produce a believable image. In addition, the lenses 13 and 48 may be smaller than the lens 17, resulting in a material saving in initial cost. Further, the lens 48 may be adjusted to cooperate with the lens system 44 of the generator 46 so that the distance from lens 48 to the screen 49 is different from the focal distance of the lens 17. The projector lens system 44 is arranged so that its distance from the transparency is less than that lens system's infinity focal length. Then the distance between lens 48 and screen 49 may be increased. In this manner, the over-all system may be adjusted to accommodate different housing requirements.

One of the important features of a display system of this type is the ability of the system to form a plausible composite image of two or more separate images of objects which are at different distances from the observer. The image produced by the generator 31 is at the greatest distance from the observer. In fact, for this discussion, consider the image produced by the generator 31 to be a fixed star background which is essentially at infinity. The image produced by the generator 46 is one of an object much closer to the observer. To approach reality, the two images must be combined to form a single image in which the far and the near objects appear to act differently. This is the purpose for fixedly supporting screen 23 and having screen 49 movable. In systems of this nature, the following equation holds true:

$$1/F = 1/D_o = 1/D_i$$

where

F is the focal length of the lens,
$D_o$ is the distance from the lens to the object, and
$D_i$ is the distance from the lens to the image.

In the case of the screen 23, the image formed on that screen by the lens 13 forms the object of the lens 17. Since the screen 23 is located at the focal distance from the lens 17, $1/F=1/D_o$, and $1/D_i=0$. Then, $D_i$ is infinite. Thus, the image which is passed through the lens 17 from the screen 23 appears to the observer to be an infinite distance away. In the system 50, the screen 49 is movable from the focal point of the lens 17 in the direction toward the lens 17. Moving screen 49 away from lens 17 throws the image out of focus. This means that in the system 50, the image the observer views appears to be at a finite distance from the lens 17. The relative distance can be adjusted over a range by the positioning of the screen 49. In addition, the screen 49 can be automatically movable in response to a prescribed condition so that the apparent distance of the image, produced by the generator 46, from the observer varies with the condition. When the screen 23 is at the focal point of the lens 17, light which is passed from the screen 23 to the lens 17 is divergent, but the light which emerges from the lens 17 is collimated. Should the screen be less than the focal distance from the lens, the light emerging from the lens is divergent.

In a display of the type discussed, the observer is usually situated in a simulated space vehicle of some nature and is being trained to operate the vehicle on a simulated mission. The mission may be the landing of the craft on a celestial body, the rendezvous of the craft with another craft or with a satellite, or a similar activity. In any case, the observer would usually be viewing the outside world through a window in his simulated craft, and the display presented is the view he would have out the window on actual mission. In such a situation, the window would serve as the stop 55, and the lens 17 would be positioned adjacent that window. Since, in normal operation, an observer would not sit perfectly stationary but would move his head from side-to-side and would look up and down, the window, or stop 55, should be smaller in diameter than the lens 17. Then, as the observer moves his head from one position to another, he uncovers portions of the display which were not originally available to him and loses some that he originally saw. In addition, as the observer moves his head, the objects which are closer to him should appear to move with repect to those which are farther away. Since the background image as produced by the generator 31 produces images which appear to be at infinity, they will appear to move hardly at all as the observer moves, whereas the image produced by the generator 46 is comparatively close to the observer, and it will appear to move as the observer changes his position of viewing. As the screen 49 approaches the focal point of the lens 17, this effect will diminish.

Figure 5:
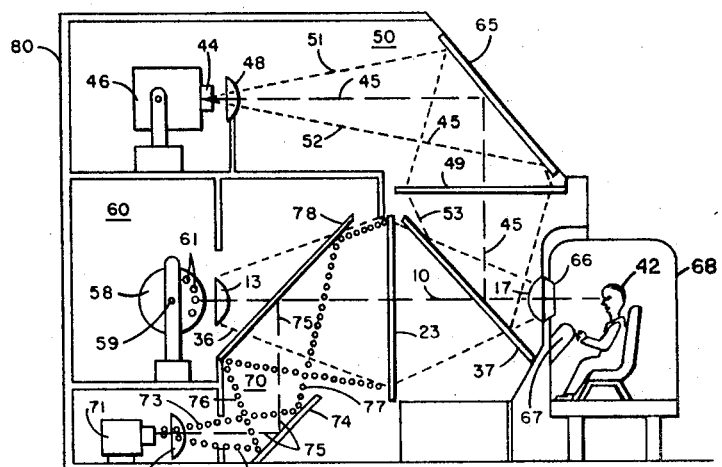
FIG. 5 is an elevational view of the apparatus used to create a composite display of three different images at distances which differ from the observer in accordance with the principles of this invention.

In FIG. 5, an observer 42 is shown seated in a room 68, or other enclosure which serves as the cabin of a spacecraft. A control panel 67 is positioned before him with suitable instruments for his operation, and a window 66 is situated above the control panel 67 convenient to his line-of-sight. In front of the window 66 is a lens 17 on an optical axis 10. Also located on the optical axis 10 at the focal distance from the lens 17 is a semi-transparent screen 23 upon the rear of which images generated by a planetarium 58 are projected through a lens 13. As discussed above, the lenses 17 and 13 are similar, and the screen 23 is fixed at the focal distance from both of the lenses. A semi-transparent mirror 78 is positioned between the lens 13 and the screen 23 at an angle of about 45° to reflect onto the screen 23 images generated by a source 71 and transmitted through a lens 72 similar to the lenses 13 and 17. Mirror 74 is arranged to reflect the image generated by the source 71 onto the mirror 78 and thence onto the screen 23. The generator 71, lens 72 and mirror 78 are so arranged that the focal distance, by way of mirrors 74 and 78, of the lens 72, is at the screen 23 the same as the focal distance of the lens 13. The image from the planetarium 58 passes through the mirror 78.

The planetarium 58 comprises a hollow sphere which contains a source of light in its interior and small lens systems 61 contained in individual cylinders mounted in perforations in its surface. The sphere is mounted for rotation on an axis 59 and is supported on an appropriate base. The image generator 71 comprises a housing containing a source of light and a transparency, neither of which are shown. The light from the source passing through the transparency is projected by a lens system also contained in the housing. The lens system comprises an object stop. The generator 46 comprises a housing which also contains a light source and a transparency. The lens system 44 of the generator 46 also serves as an object stop. The image produced by the generator 46 is projected through a lens 48, which is similar to the lenses 13 and 17, onto a mirror 65 which is supported at an angle of 45° to the optical axis of the lens 48. The image reflected by the mirror 65 falls upon a translucent screen 49 which is movable through a small distance about the focal point of the lens 17. On the other side of the translucent screen 49, a semi-transparent mirror 37, mounted at an angle of 45° to the optical axes 45 and 10, passes the image from the planetarium 58 and reflects the image on the screen 49 through the lens 17. In addition, the image produced by the generator 71 is projected through a lens 72 and reflected by mirrors 74 and 78 supported at angles of 45° to the optical axis 75 onto the translucent screen 23. In addition, the semi-transparent mirror 78 passes the image from the planetarium 58 to the screen 23. The images produced by the generators 58, 46 and 71 are combined at the lens 17 through which the observer 42 looks.

In operation, the planetarium 58 generates a suitable fixed star image which is projected through the lens 13 onto the screen 23. The observer, in effect, looks through the lens 17 onto the screen 23 where he sees the images projected thereon. At the same time, the two generators 46 and 71 are also producing images. The image from the generator 46 passes through the lens 48 and is reflected by the mirror 65 onto the translucent screen 49. The observer 42, in effect when he is looking through the lens 17, sees this image reflected by the mirror 37. Similarly, the image from the generator 71 is reflected by the mirror 74 and the mirror 78 onto the screen 23 where it is observed by the viewer 42. The screen 23 is fixed at the focal distance from the lenses 13 and 17 and from the lens 72 as the optical axis 75 of that lens is bent by the mirrors 74 and 78. However, the screen 49 is movable through a short distance near the focal distance from the lens 17. Thus, in accordance with the discussion above, the images projected onto the screen 23 appear to be at an infinite distance from the observer 42, but the image on the screen 49 seems to be at a closer, finite distance. As mentioned earlier, the two similar lenses together with the associated optical stops serve to compensate for the aberrations introduced by either lens. Thus, in the system illustrated in FIG. 5, the lenses 13, 17, 48 and 72 are similar, and the lens 17 together with the stops in the image generators and at the window 66 itself tend to compensate for the distortions introduced by any of the other lenses 13, 48 and 72. Each of the image generators may be programmed to present images which change with time. In addition, the screen 49 may be programmed to operate together with the image generators and the other parts of the system to produce a composite image of several devices which change in their appearance as the simulated mission proceeds. The window 66 is provided at about eye level so that the observer 42 automatically looks through the window 66 as he sits at the controls of the vehicle. When the observer 42 moves his head to see better from the window 66 or to look to the side, he sees more of the image than when he looks directly out through the center of the window 66 along the optical axis 10 of the lens 17. When the image generators 46 and 71 use film strips, they can readily portray changing aspects of the same object with time. The planetarium 58 is, of course, mounted for automatic rotation on each of its axes so that as the simulated vehicle moves through space, the fixed star background which is portrayed to the observer 42 changes to indicate different positions in space. In addition, one of the image generators 46 or 71, in this case the generator 46, may be used to produce an image of another celestial body, such as the moon, toward which the vehicle is proceeding. As time passes, not only does the appearance of the surface of the moon change, but its size also changes, increasing as the vehicle approaches, and decreasing as the vehicle retreats. This is produced by the movement of the screen 49 as well as by the changes in the transparencies which are mounted in the projector 46. As the screen 49 is moved, the appearance of the images which are projected onto its surface changes in relation to the fixed images. When the screen 49 is at the focal point of the lens 17, the image on the screen 49 appears to be at infinity from the observer 42. As the screen 49 moves from this point, the image on its surface appears to move closer to the observer. Thus, the film in the projector 46 may change to generate images which show different aspects of the object depicted, in this case the moon, but it is the correlated movement of the screen 49 which creates the impression of changing relative distance from the observer. This is an important feature of any image system which is to create a plausible image.

The system shown in FIG. 5 is constructed with relatively inexpensive simple positive lenses 13, 17, 48 and 72, a pair of flat or plane mirrors 65 and 74, a pair of semi-transparent plane mirrors 37 and 78, and a couple of translucent screens 23 and 49. The mechanization of the system is simple. The projectors 46 and 71 may be standard stock projectors modified to produce changing images by changing transparencies on command or at a slow and controlled rate. In addition, the images created by the system of FIG. 5 and seen by the observer 42 are clear, sharp without appreciable distortion, and bright. The brightness and clarity of the final images are much superior to those of the older, spherical mirror projection systems.

Figure 6:
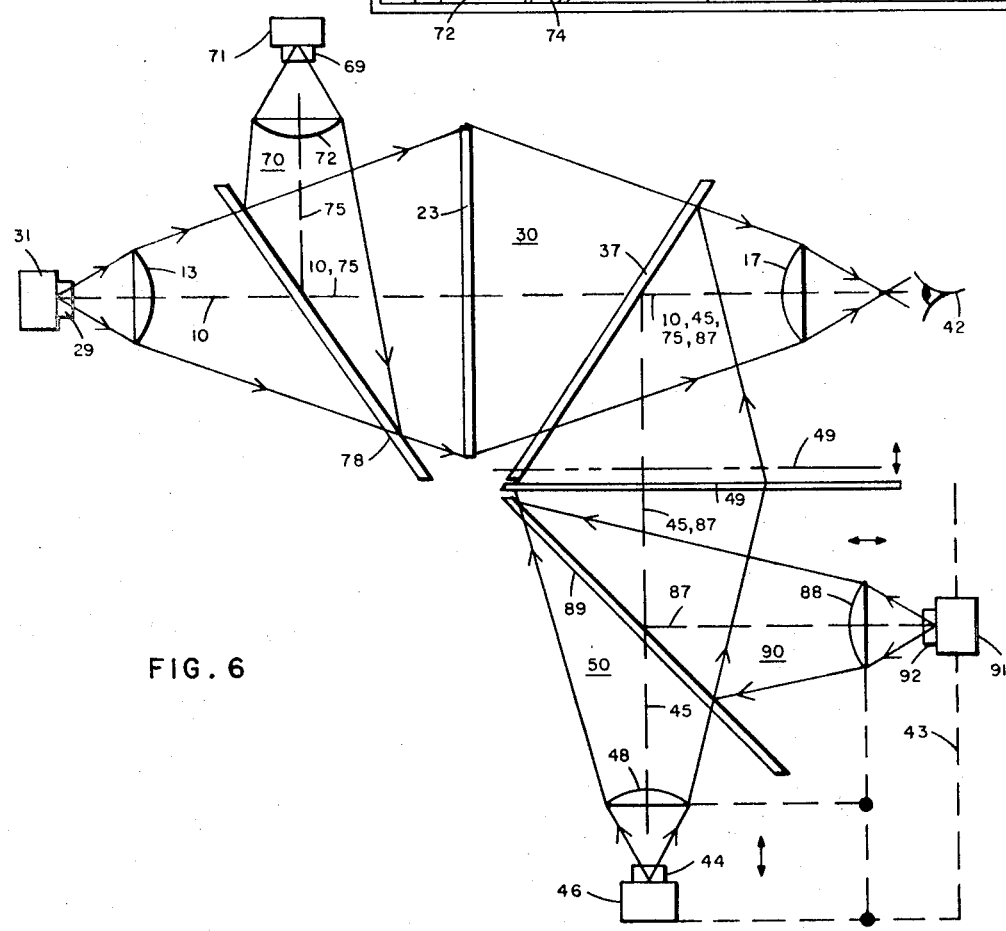
FIG. 6 is a schematic showing of a system similar to that of FIG. 4 but incorporating additional images in accordance with the principles of this invention.

When a plurality of images are to be provided for the observer 42 such that more than one of the images are to move in a manner such that their relative distances from the observer vary, then the system shown in FIG. 6 may be used. The system of FIG. 6 is essentially the same as that of FIG. 5 with the addition of an image generator 91 whose image is projected onto the movable translucent screen 49.

A maximum field of view of 90° is possible when two screens such as 23 and 49 are used to depict images of different relative distances. In addition, no more than two screens such as 23 and 49 can be used at right angles to each other without reducing the width of the field of view. For this reason, when several different images from different generators are used, they are combined on the two screens. Since the system is essentially the same as those described heretofore, only the differences will be described herein. The planetarium 58 shown in FIG. 5 has been replaced with another image generator 31. It should be mentioned at this time, that, actually, the image generators which are shown in the various figures of the drawings are merely illustrative, and any of several types alone or in combination may be used for the purposes of this invention. Thus, there have been described a planetarium which generates images of a fixed star field, a transparency projector which projects images previously recorded on transparencies by photographic or other means, and a television projection system which, in effect, provides images of solid objects. Any of these image generators may be used in any of the locations indicated which are occupied by image generators in the drawings. In addition, an image generator 91 having a lens system 92, which also serves as an optical stop, projects an image earlier prepared on a transparency through a lens 88, which is similar to the lens 17, onto a semi-transparent mirror 89. The image from the generator 91 reflected by the mirror 89 falls upon the back surface of the translucent screen 49 which is mounted to be moved about the focal point of the lens 17. In addition, an image produced by the generator 46 is projected by the lens 48 through the semi-transparent mirror 89 onto the back of the translucent screen 49 and is there combined with the image from the generator 91. When the screen 49 is moved from the focal point of the lens 17, the apparent distances from the observer 42 of both of the images projected thereupon vary similarly and seem to grow less. This is particularly true when the images on the screen 49 are seen together with the images projected onto the screen 23 by the generators 31 and 71. The screen 23 is fixed at the focal distance from the lens 17 and the images thereupon appear to be at infinity. In practice, the system can be enlarged to accommodate as many separate images as necessary to create a simulation of the problem desired. Also, as mentioned above, any of several different image generators may be combined to produce the types of images desired with the movements and changes of each programmed to meet the specific needs of any particular problem.

Figure 7:
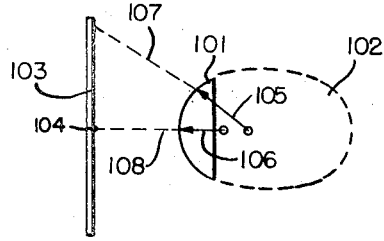
FIGS. 7 and 8 are schematic views of lenses which may be used in the system of this invention.

The lenses 13, 17, 48, 72 and 88 are used to project an image produced by an image generator onto a flat screen. To avoid distortion as much as possible, an elliptical lens has been developed to flatten the image. One form of such a lens is shown in FIG. 7 in which an ellipse 102 is shown in dotted lines with one end of the ellipse 102 formed with solid lines to define a plano-convex lens 101. A screen 103 is shown with an image, at the focal point 104 of the lens 101, projected onto it as defined by the lines 105, 106, 107 and 108. The radius of curvature of the lens 101 is continuously changing along its curved surface. Thus, the radius of curvature shown by line 105 at the outer edge of the lens 101 is longer than the radius of curvature 106 at the center of the lens. By the same token, the distances from the convex side of the lens 101 to the surface of the screen 103 are not the same from all 11 points. Thus, the line 107 is longer than the line 108. The relationship between the length of the line 108 with respect to the length of the line 106 is the same as the relationhsip of the length of the line 107 with respect to the line 105. In this manner, the elliptical lens 101 tends to flatten an image transmitted through it with respect to the same image transmitted through a spherical lens.

Figure 8:
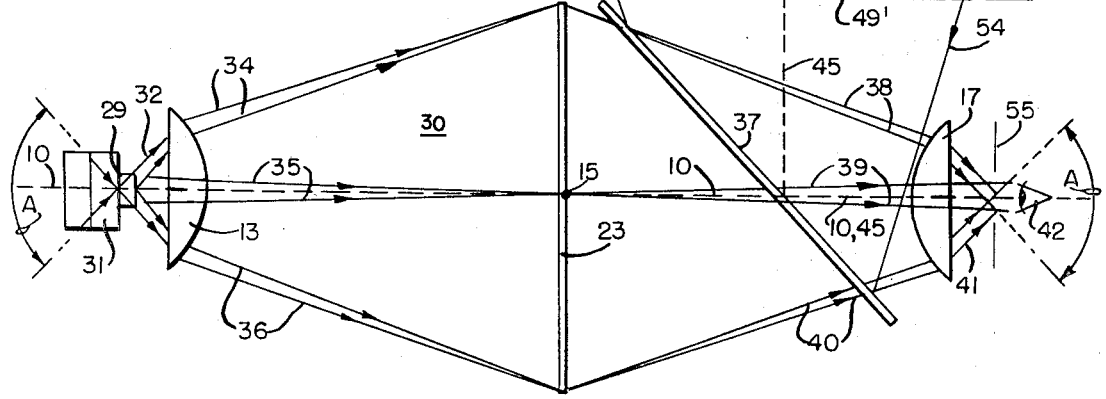
Figure 8:
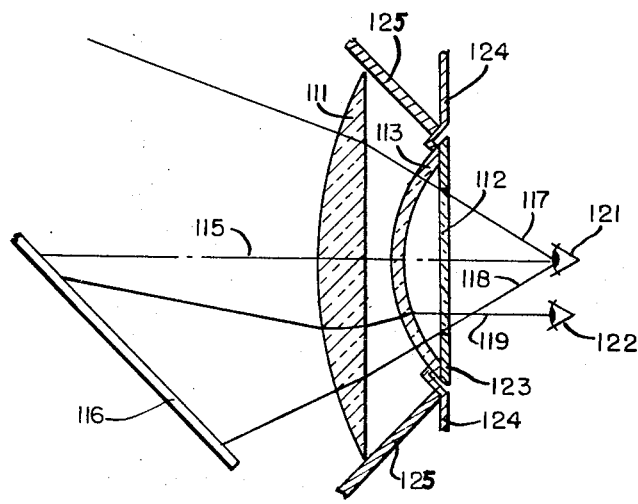

Another way in which distortion can be introduced into the system to reduce the reality of the final results is by the swimming effect which is often produced when the osberver moves his eyes from the optical axis of the lens 17. To reduce this swimming effect, a spherical corrector may be used as shown in FIG. 8. A lens 111, of the elliptical type shown in FIG. 7, projects an image which passes through a semi-transparent mirror 116 through a window 112 where it is viewed by an observer whose eye 121 is on the optical axis 115 of the lens 111. The window 112 is mounted in a bulkhead 123. Between the window 112 and the lens 111 is a spherical corrector 113 held in place by a bezel 124 or another suitable device. The diagonal of the window 112 is about the same size as the diameter of the spherical lens 113. Light, as shown by lines 117 and 118, which passes through the lens 111 and the corrector 113 to an observer on the optical axis 115 is not affected by the corrector 113. However, that light, as shown by the line 119, which passes through the lens 111 and the corrector 113 toward an observer 122 at a point off the optical axis 115, is refracted by the corrector 113 producing a negative aberration, tending to compensate for the apparent movement of the image as the eye moves from the position occupied at 121 to the position 122. The farther off the optical axis the observer is, the greater the correction. In addition, the system shown in FIG. 8 demonstrates how, with a lens 111 which is larger than the window 112, a wide field of view which is actually larger than that seen at any one time through the window 112 is achieved. As an observer moves his head to look through another portion of the window 112, he looks through the window at a different angle seeing more of the image than that available to him when his eye is on the optical axis 115. A shroud 125 surrounding the window 112 and the lens 111 prevents looking beyond the lens 111. In this manner, a 90° field of view is achieved, with the angle of view through the window 112 at any point being less than that.

In summary, the system of this invention provides a virtual image window display which approaches reality and which is relatively inexpensive in both its construction and its maintenance. The system of this invention utilizes image splitters or semi-transparent mirrors for combining images onto a single optical axis. It utilizes simple positive lenses which are self-correcting. It utilizes two or more translucent screens upon which images may be projected and which are used to create the impression of differing distances from an observer of the several images generated by the system. Simple and inexpensive image generators of any suitable type may be used, and used interchangeably, to produce the images and the programmed changes of those images to meet the needs of any particular situation. The image transmission and projection systems used in the system of this invention are kept simple and direct to reduce as much as possible the absorption of light and the subsequent dimming of the images. In addition, the projection systems used are low in cost and inherently self-correcting to reduce the over-all cost of the system and the cost of producing a realistic image. The final results are realistic in their appearance and in their actions. Distant objects appears to be at a distance; close objects appear to be close.

While it is realized that the above specification may indicate to others in the art additional ways in which the principles of this inventon may be used, it is intended that this invention be limited only by the scope of the appended claims.

What is claimed is:

1. A system for producing a composite realistic image of several objects which are to appear to be at different distances from an observer, said system comprising at least a first image generator and a second image generator, a first translucent screen and a second translucent screen, a first lens system for projecting an image from said first image generator onto said first screen, a second lens system for projecting an image from said second image generator onto said second screen, a third lens system for viewing a composite of the images formed on said first and said second screens, said first screen being fixedly arranged at the focal plane of said third lens, said second screen being movably supported adjacent the focal distance from said third lens, and means for selectively moving said second screen toward said third lens from a distance equivalent to the focal length of said third lens whereby the image projected upon said first screen appears to lie at infinity and the image projected upon said second screen may be caused selectively to appear to move closer to and farther from an observer, each of said first, second, and third lens systems comprising a plano-convex lens in which the convex surface of said third lens system faces the convex surfaces of said first and second lens systems to compensate for aberrations introduced by said first and second lens systems.

2. The system defined in claim 1 wherein said third lens system includes a plano-convex lens having a truncated ellipsoid shape.

3. The system defined in claim 1 further including a window mounted in a wall and wherein said third lens system is mounted adjacent said window with its plano surface approximately parallel to said wall and wherein the diagonal dimension of said window is smaller than the diameter of the circle formed by the plano surface of said lens.

4. An optical system for enabling an observer to view a substantially undistorted image, said system comprising an image generator, a first projection lens adjacent said image generator, said first lens having an optical axis and a focal point on said optical axis, a translucent screen mounted approximately at said focal point and at right angles to said optical axis and a second lens having an optical axis common with the optical axis of said first lens and having a focal point on said optical axis located approximately at said screen, said first and second lenses each comprising a plano-convex lens arranged so that the convex surfaces of said first and second lenses face each other, whereby the said first lens projects the image generated by said image generator onto said screen with distortion and said second lens transmits the image formed on said screen to an observer correcting the distortions in said image introduced by said first lens.

5. The system defined in claim 4 further including an optical stop symmetrically disposed about the optical axis of said first lens and located between said image generator and said first lens and having a diameter less than the diameter of said first lens and a second optical stop symmetrically disposed about the optical axis of said second lens and located between said second lens and an observer and having a diameter less than the diameter of said second lens whereby said first and said second optical stops tend to aid in correcting distortions introduced into said image by said lenses.

References Cited

UNITED STATES PATENTS

| | | | |
|---|---|---|---|
| 1,821,626 | 9/1931 | Fleischer | 88—24Q |
| 1,959,498 | 5/1934 | Planskoy | 352—89 |
| 2,336,508 | 12/1943 | Smith et al. | 352—89 |
| 2,958,258 | 11/1960 | Kelly | 88—24Q |
| 3,350,980 | 11/1967 | Margolin | 88—24Q |

NORTON ANSHER, Primary Examiner

R. M. SHEER, Assistant Examiner

U.S. Cl. X.R.

352—89